United States Patent
Heath (10) Patent No.: US 9,163,422 B2
(45) Date of Patent: Oct. 20, 2015

(54) SEISMIC ATTACHMENT MEMBER

(75) Inventor: Richard W. Heath, Yorba Linda, CA (US)

(73) Assignee: COOPER B-LINE, INC., Houston, TX (US)

(*) Notice: Subject to any disclaimer, the term of this patent is extended or adjusted under 35 U.S.C. 154(b) by 540 days.

(21) Appl. No.: 12/609,945

(22) Filed: Oct. 30, 2009

(65) Prior Publication Data

US 2010/0107518 A1 May 6, 2010

Related U.S. Application Data

(60) Provisional application No. 61/110,467, filed on Oct. 31, 2008.

(51) Int. Cl.
 *E04B 1/98* (2006.01)
 *E04H 9/02* (2006.01)
 *F16L 55/035* (2006.01)

(52) U.S. Cl.
 CPC .............. *E04H 9/02* (2013.01); *F16L 55/035* (2013.01); *E04H 9/028* (2013.01)

(58) Field of Classification Search
 CPC ............ F16L 3/127; F16L 3/16; F16L 3/221; F16L 3/133; F16L 3/20; F16L 55/035; F16L 3/24; E04H 9/02; E04H 9/028; F16M 13/027; E04C 2003/026; F16B 2/065; F16B 2/06; Y10T 403/32861
 USPC ........ 52/167.3, 167.1, 220.6, 506.04, 506.06; 248/58, 65, 317; 403/72, 13
 See application file for complete search history.

(56) References Cited

U.S. PATENT DOCUMENTS

| | | | | |
|---|---|---|---|---|
| 4,065,218 A | * | 12/1977 | Biggane | 403/71 |
| 4,634,327 A | * | 1/1987 | Kowalski | 411/432 |
| 4,875,816 A | * | 10/1989 | Peterson | 411/104 |
| 5,048,243 A | * | 9/1991 | Ward | 52/167.4 |
| 5,118,233 A | * | 6/1992 | Mitchell | 411/5 |
| 5,289,665 A | * | 3/1994 | Higgins | 52/655.1 |
| 6,247,274 B1 | * | 6/2001 | Thompson et al. | 52/167.1 |
| 6,273,372 B1 | * | 8/2001 | Heath | 248/62 |
| 6,415,560 B1 | * | 7/2002 | Rinderer | 52/167.1 |
| 6,679,023 B2 | * | 1/2004 | Rizzotto | 52/653.2 |
| 6,837,009 B1 | * | 1/2005 | Roth | 52/167.1 |
| 2006/0024127 A1 | * | 2/2006 | Heath | 403/150 |
| 2006/0190182 A1 | * | 8/2006 | LaBrie | 702/18 |

* cited by examiner

*Primary Examiner* — Brian D Mattei
(74) *Attorney, Agent, or Firm* — Senniger Powers LLP (57) ABSTRACT

A seismic bracing assembly has a first subassembly and a second subassembly that are connected by a sleeve. The first subassembly has a structural yoke used to secure the first subassembly to a structural member. The second subassembly has another yoke used to secure the second subassembly to an anchoring member. The first and second subassembly have a sufficient length to allow rough in assembly of the two subassemblies with the sleeve that couples them together.

11 Claims, 8 Drawing Sheets

SEISMIC ATTACHMENT MEMBER

CROSS-REFERENCE TO RELATED APPLICATIONS

This application claims the benefit of priority under 35 U.S.C. §119 (e) of U.S. Provisional Patent Application No. 61/110,467, filed Oct. 31, 2008 which is hereby incorporated herein by reference in its entirety.

BACKGROUND OF THE INVENTION

1. Field of the Invention

The present invention generally relates to seismic bracing assemblies. More specifically, the present invention relates to seismic bracing assemblies such as those used to brace pipe hangers or trapezes in construction.

2. Description of the Related Art

Conventionally, hangers such as described, when used in systems comprising trays holding communication cable, electrical wiring or the like or for pipe or conduit, etc. in office buildings, manufacturing plants and other facilities,. include support rods extending vertically downward from a ceiling or truss system. The support rods provide support for the hangers that extend in a generally horizontal direction. Accordingly, the support rods do not per se provide sufficient lateral support for resisting large forces, such as those induced by an earthquake. Additional seismic bracing attached to the hangers provides the added lateral support desired to withstand seismic activity.

The seismic bracing typically has two ends, one attachable to a support such as a ceiling or truss system and the other attachable to the hanger. Where an existing hanger is to be fitted with seismic braces, the braces are preferably connected while the support rods remain fully supportive of the hanger.

SUMMARY OF THE INVENTION

A bracing assembly is desired that allows for rough fitting of the bracing assembly. Without such rough in capabilities, the length of bracing assembly must be carefully measured and cut, which can be very time consuming in a large construction project. Accordingly, a more flexible assembly is desired that can accommodate several inches of variation.

Additionally, a bracing assembly is desired in which a single assembly can be used for multiple sizes of threaded rod. Preferably, the multiple sizes can take into account size ranges and provide an enlarged size range of accommodated diameters due to a specially configured passageway.

BRIEF DESCRIPTION OF THE DRAWINGS

These and other features, aspects and advantages of the present invention will now be described with reference to the drawings of a preferred embodiment, which embodiment is intended to illustrate and not to limit the invention, and in which figures.

DETAILED DESCRIPTION OF THE PREFERRED EMBODIMENT

Figure 1:
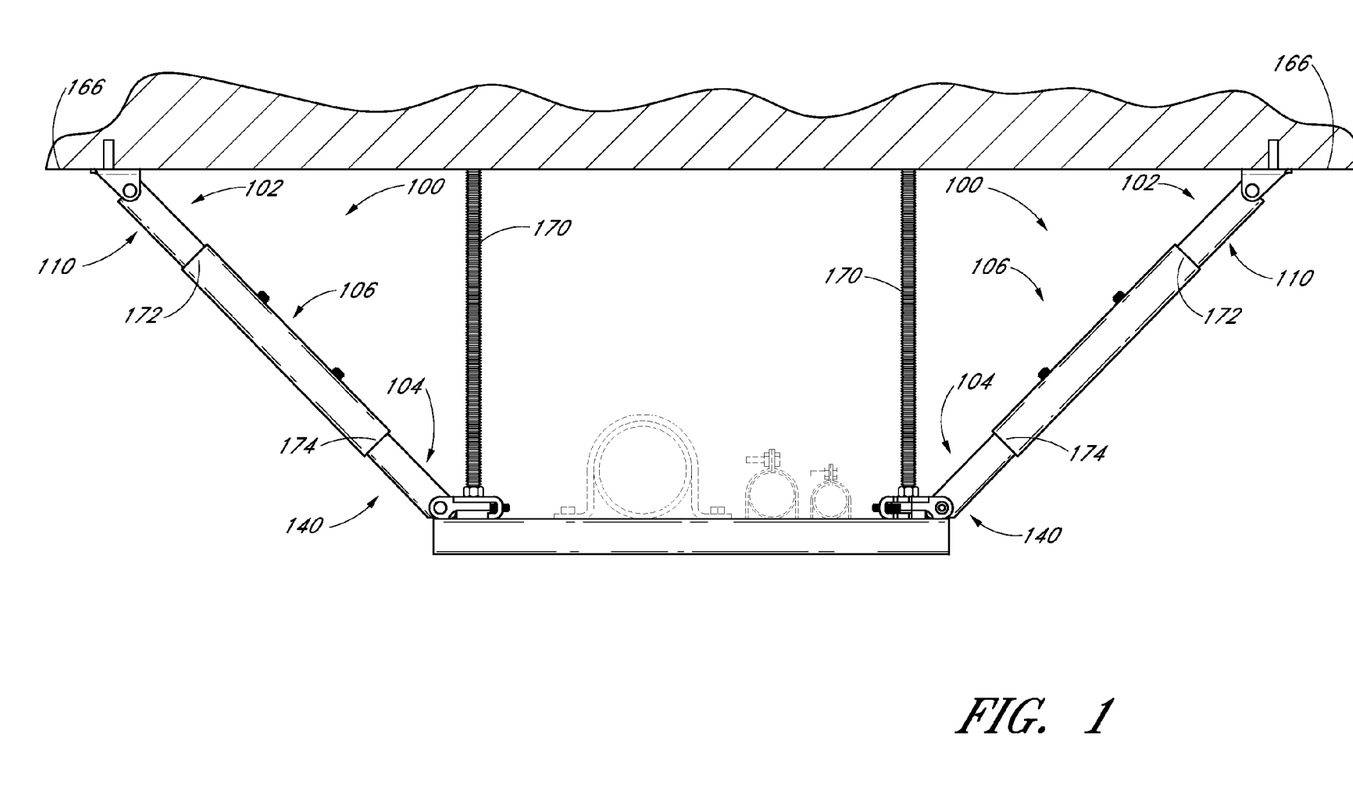
FIG. 1 is a side view of a trapeze assembly using support rods, hangers and bracing assemblies to support conduits.
Figure 2:
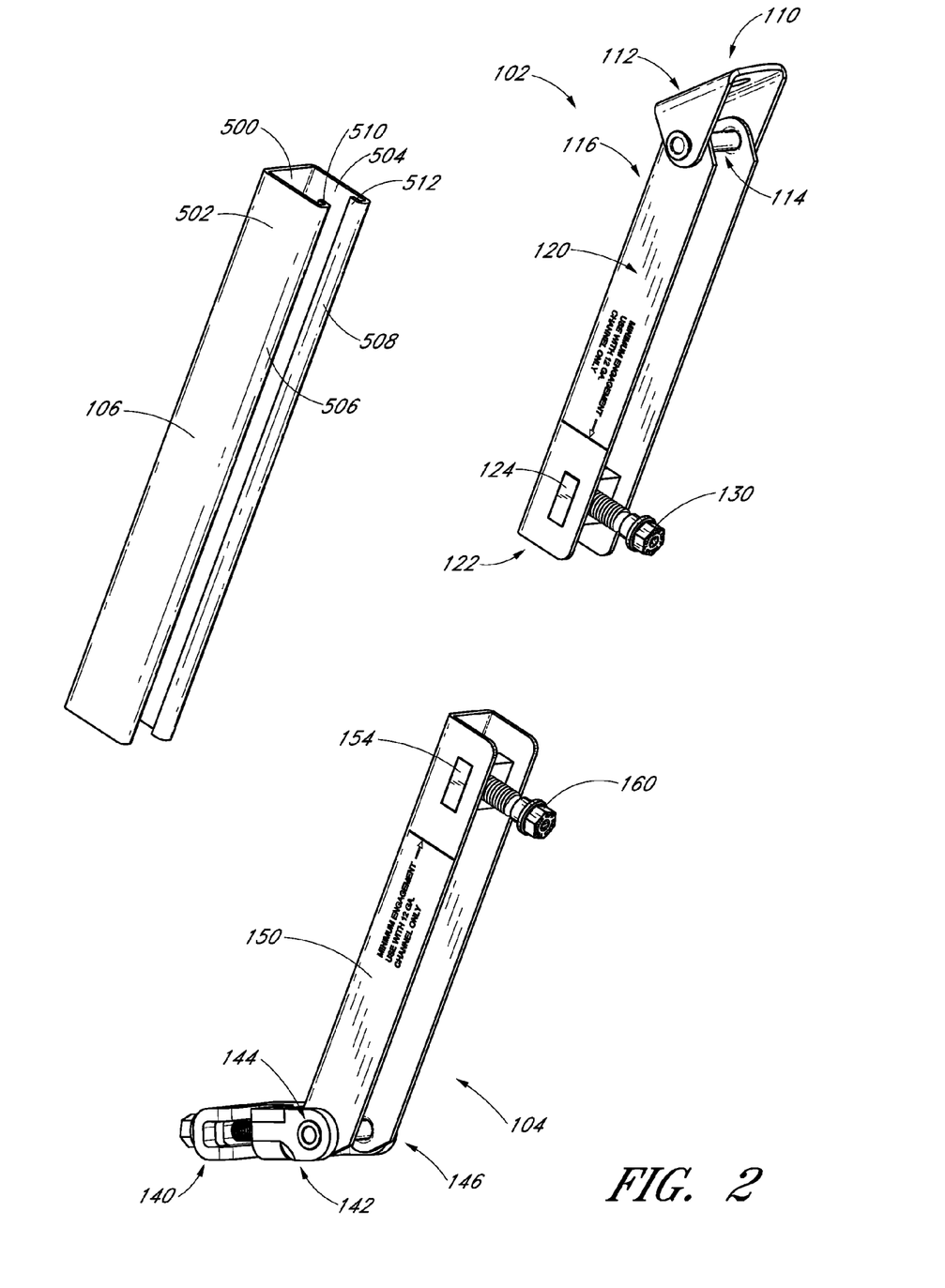
FIG. 2 is a partially exploded perspective view of a bracing assembly that is arranged and configured in accordance with certain features, aspects and advantages of an embodiment of the present invention.

FIG. 1 illustrates an embodiment of a seismic bracing assembly 100 that is arranged and configured in accordance with certain features, aspects and advantages of the present invention. As illustrated, the assembly 100 comprises a first subassembly 102 and a second subassembly 104. A sleeve 106 can be used to join the first subassembly 102 and the second subassembly 104. Advantageously, the sleeve 106 can have any of a range of sizes to provide sufficient strength and support to the junction between the first subassembly 102 and the second subassembly 104.

In some embodiments, possible overlap between the first subassembly 102 and the sleeve 106 and between the second subassembly 104 and the sleeve 106 provides up to about 12 inches of adjustability. Preferred degrees of overlap can be indicated by markings along one or more of the walls of the first subassembly 102 and along one or more of the walls of the second subassembly 104. In some embodiments, the overlap created by the sleeve 106 can provide between about 4 inches and about 8 inches of adjustability while in some embodiments, the overlap created by the sleeve 106 can provide between about 2 inches and about 10 inches of adjustability. The adjustability is a distinct advantage over prior constructions that required stricter measurements because the adjustability allows one to rough in a bracing installation by using estimated lengths and then take advantage of the adjustability to provide a rapid installation having suitable strength.

In the illustrated configuration, the first subassembly 102 comprises an upper attachment 110. The upper attachment 110 generally comprises a structural yoke 112. One or more mechanical fasteners 114 secure the structural yoke 112 to a first end 116 of a first channel member 120. A second end 122 of the first channel member 120 contains a nut 124. The nut 124 comprises a threaded opening 126 (see FIG. 3) that receives a threaded member 130. The threaded opening 126 preferably is able to be generally axially aligned with an opening 132 (see FIG. 3) in the first channel member 120 such that an end of the threaded member 130 can be somewhat captured within the opening 132 of the channel member 120.

In the illustrated configuration, the second subassembly 104 comprises a lower attachment 140. The lower attachment 140 generally comprises a yoke 142. One or more mechanical fasteners 144 secure the yoke 142 to a first end 146 of a second channel member 150. A second end 152 of the first channel member 150 contains a nut 154. The nut 154 comprises a threaded opening 156 (see FIG. 3) that receives a threaded member 160. The threaded opening 156 preferably is able to be generally axially aligned with an opening 162 (see FIG. 3) in the second channel member 150 such that an end of the threaded member 160 can be somewhat captured within the opening 162 of the channel member 150.

Figure 3:
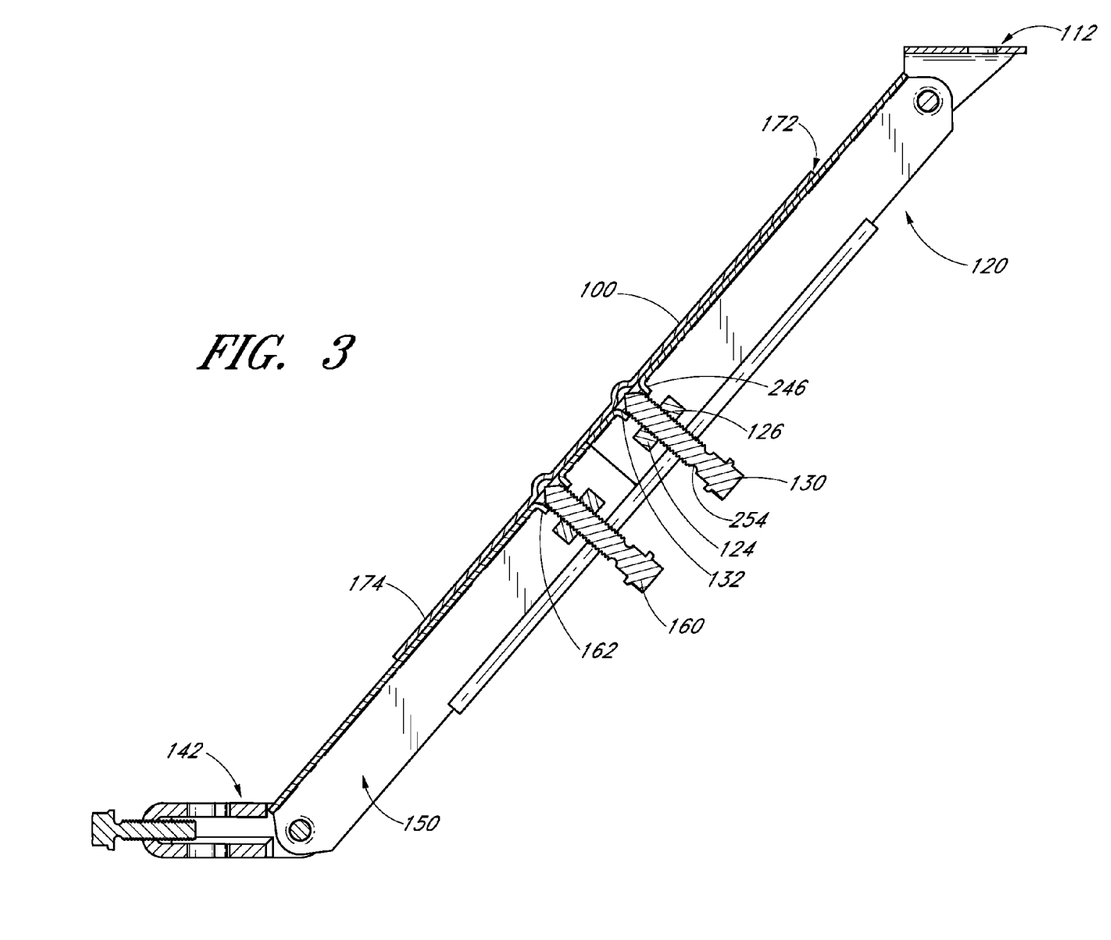
FIG. 3 is a cross sectioned view of the bracing assembly of FIG. 2.
Figure 3A:
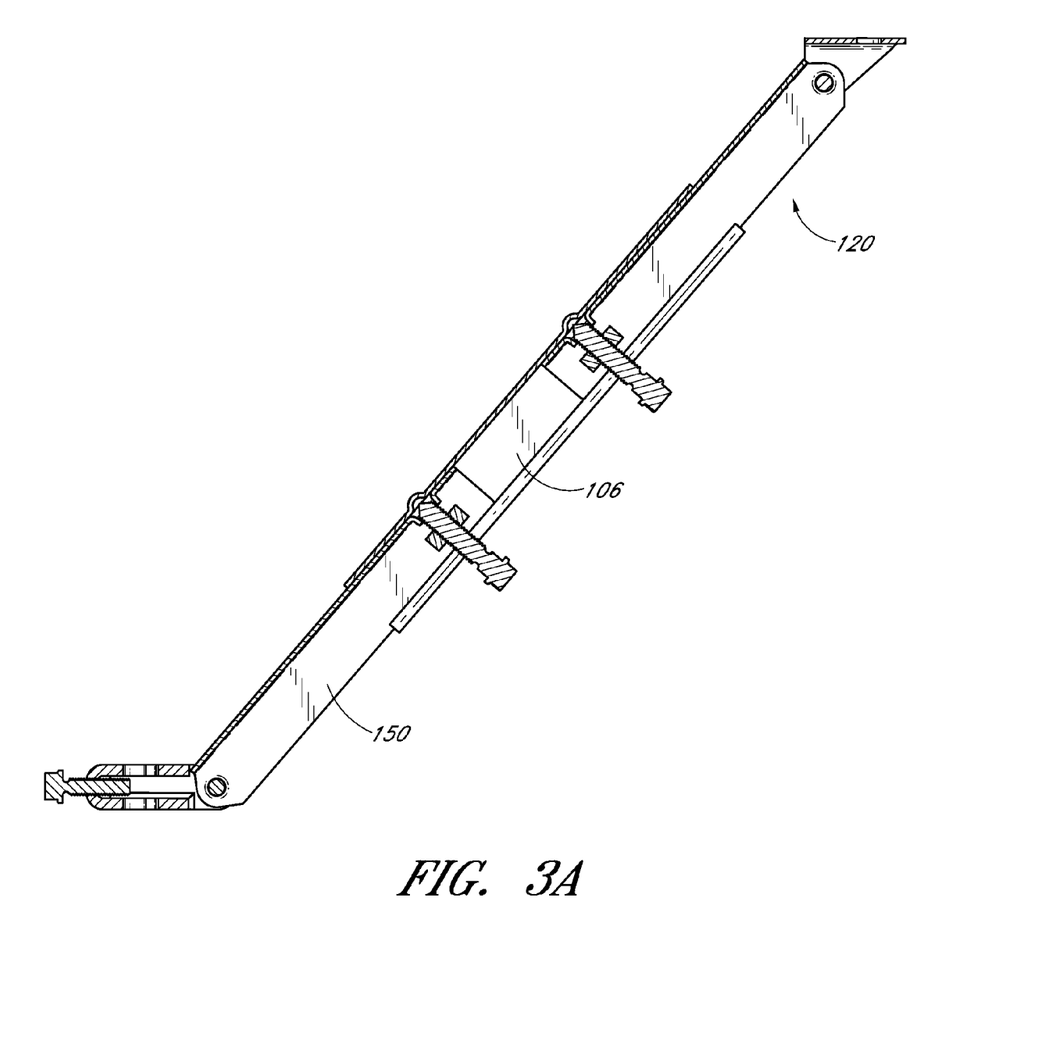
FIG. 3A is a cross sectioned view of the bracing assembly of FIG. 2 with the components moved relative to their positions in FIG. 3.

In use, as shown in FIG. 1, the structural yoke 112 of the upper attachment 110 can be secured to an anchoring structure 166, such as a wall, a ceiling or the like. The yoke 142 of the lower attachment 140 can be secured to a braced component 170, such as a threaded rod or a component of a trapeze assembly. By receiving a portion of the first channel member 120 and a portion of the second channel member 150, the sleeve 106 secures the first channel member 120 of the upper attachment 110 to the second channel member 150. As shown in FIG. 3, at least a portion of a first end 172 of the sleeve 106 extends to a location along the first channel member 120 between the opening 132 and the structural yoke 112. Similarly, at least a portion of a second end 174 of the sleeve 106 extends to a location between the opening 162 and the yoke 142.

With the relative positions determined for the sleeve 106, the first channel member 120 and the second channel member 150, the threaded members 130, 160 can be tightened to secure together the sleeve 106 and the first channel member 120 and the sleeve 106 and the second channel member 150, respectively. In other words, as the threaded member 130 is tightened, the end of the threaded member 130 extends through the opening 132 in the first channel member 120 and is driven into the sleeve 106, which forces the sleeve 106 away from the first channel member 120. As the sleeve 106 is moved above from the first channel member 120, portions of the sleeve 106 and the first channel member 120 are forced together. Thus, the tip of the threaded member 130 wedges against the first channel member 120 and the sleeve 106 and the first channel member 120 are pulled together. Both of these actions act to secure the sleeve 106 and the first channel member 120 in relative position. In some embodiments, each of the threaded members 130, 160 comprises a cone point tip and a twist off bolt head such that the cone point tip can be embedded in the sleeve 106 and the twist off bolt head can provide quick visual confirmation that sufficient torque was used to tighten the threaded members 130, 160.

As described above, the upper attachment 110 generally comprises four main components: the structural yoke 112, the first channel member 120, the nut 124 and the threaded member 130. Each of these will be described now in greater detail.

Figure 4:
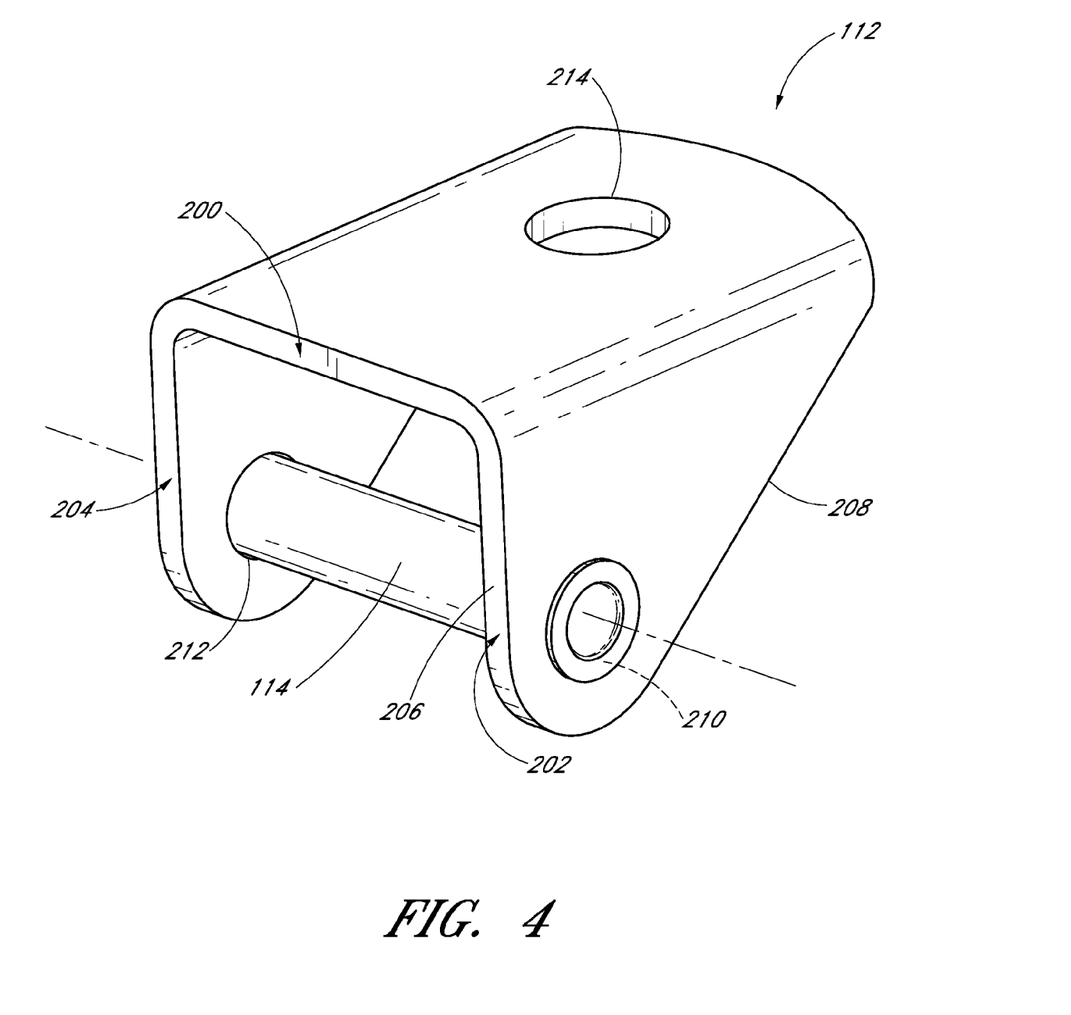
FIG. 4 is an enlarged perspective view of a yoke of an upper attachment of the bracing assembly of FIG. 2.

With reference to FIG. 4, the structural yoke 112 generally comprises a base wall 200, a first ear 202 and a second ear 204. In the illustrated configuration, the yoke 112 is formed from a single piece of material with the first ear 202 and the second ear 204 being bent to about a ninety degree angle relative to the base wall 200. In some configurations, the material used for the yoke comprises carbon steel with a zinc finish but other materials can be used. The material can be about 0.120 inch thick with a pre-bending width of about 2.246 inches and a length of about 4.292 inches. The structural yoke 112 can have a weight of about 1.437 pounds. When bent, an inside dimension between the first ear 202 and the second ear 204 can be about 1.573 inches. The height of each of the bent ears 202, 204 preferably is about 1.427 inches. Other sizes and weights are possible.

As shown, each of the two ears 202, 204 preferably has a shape similar to a right triangle. Other shapes are possible. In a corner defined by the shorter leg 206 and the hypotenuse 208 of the triangle, each of the two ears 202, 204 preferably comprises a respective opening 210, 212. The openings 210, 212 preferably are axially aligned with each other.

The base wall 200 is generally rectangular. In the illustrated construction, one end of the base wall 200 can comprises a slightly rounded end. Other constructions are possible. In the illustrated construction, at least one opening 214 is provided through the base wall 200. The opening 214 preferably is positioned at an opposite end of the base wall 200 relative to the openings 210, 212. The opening 214 can be used to secure the structural yoke 112 to the braced component 170.

The two openings 210, 212 that are positioned in the ears 202, 204 can receive the at least one mechanical fastener 114. In some configurations, the mechanical fastener 114 comprises one or more threaded members (e.g., bolts and nuts). In some configurations, the mechanical fastener 114 comprises a shaft secured by snap rings, cotter pins or the like. In some configurations, the mechanical fastener 114 comprises one or more rivets or semi-tubular rivets. In some configurations, the semi-tubular rivets can be zinc finished. The mechanical fastener 114 can be any suitable structure keeping in mind the goal of pivotally coupling the structural yoke 112 to the first end 116 of the first channel member 120.

Figure 5:
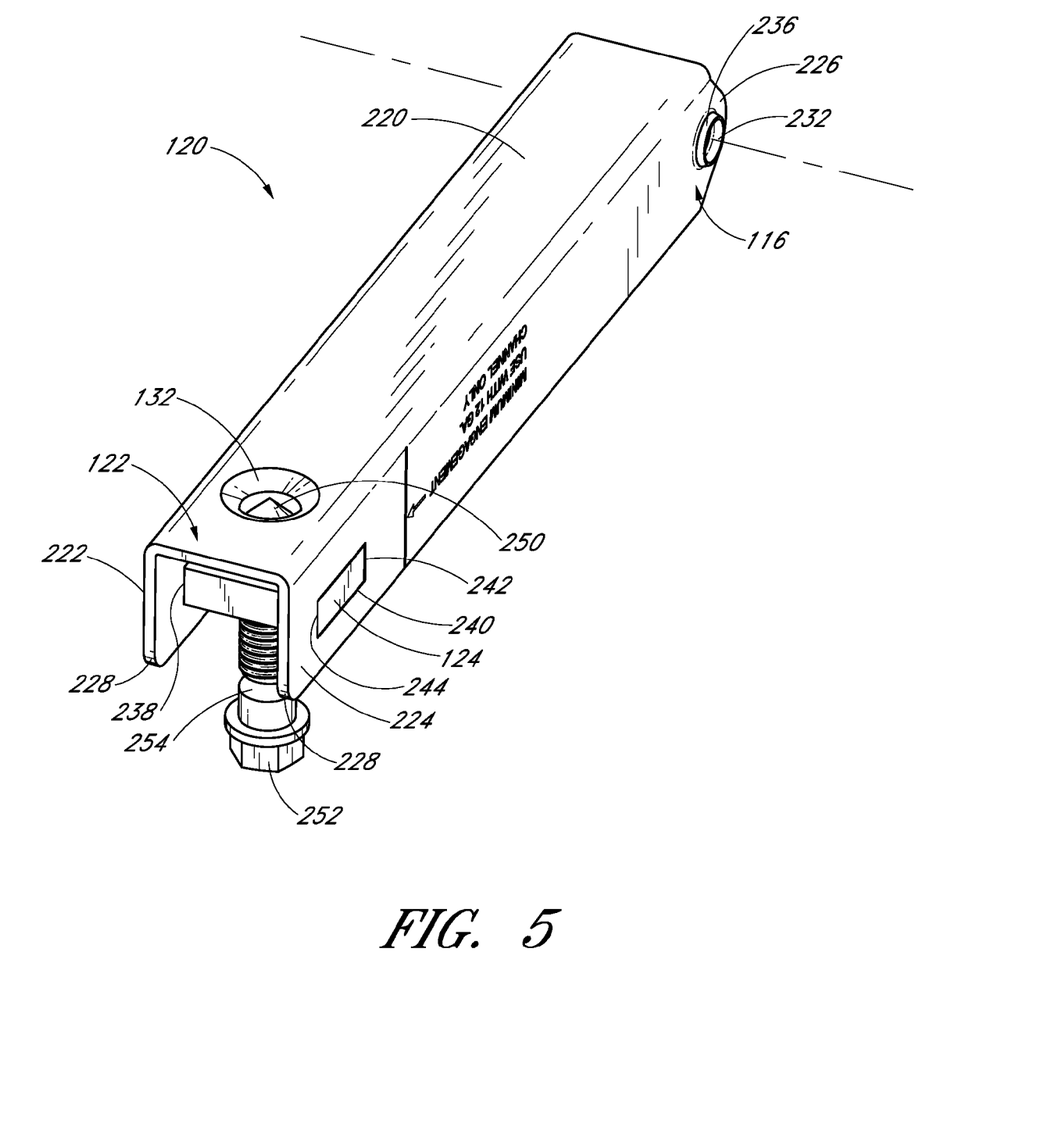
FIG. 5 is an enlarged perspective view of a channel used in the bracing assembly of FIG. 2.

The first channel member 120 generally comprises a base wall 220, a first side leg 222 and a second side leg 224. In the illustrated construction, the first channel member 120 is formed of a single piece of material with the two side legs 222, 224 being bent upwardly to about a ninety degree angle relative to the base wall 220. The first channel member 120 preferably is formed of carbon steel that has a zinc finish. Other materials also can be used. The material can be about 0.105 inch thick with a pre-bending width of about 1.545 inches and a length of about 9.375 inches. The first channel member 120 can have a weight of about 1.241 pounds. When bent, the distance between the outside surfaces of the two side legs 222, 224 can be about 1.375 inches, which is easily received within the inside dimension of the structural yoke 112. In some configurations, the relationship of the first channel member 120 being received within the structural yoke 112 can be reversed; however, the illustrated construction reduces the amount of materials used in the assembly and also reduces the weight of the overall assembly. The height of the bent side legs 222, 224 can be about 1.375 inches. Other sizes and weights are possible.

As shown, the base wall 220 is generally rectangular. The two side legs 222, 224 have differing shapes at the first end 116 and the second end 122. The first end 116 comprises a generally tapering configuration 226. The tapering configuration 226 provides enhanced clearance for pivoting of the first channel member 120 relative to the structural yoke 112. Other constructions are possible.

The second end 122 generally comprises a squared construction with a radiused corner 228. The radiused corner 228 eases insertion of the first channel member 220 into the sleeve 106. Other suitable configurations can be used and can include angled corners or the like. In less advantageous configurations, a square corner can be used but such a configuration is more difficult to assemble in the field.

The first end 116 preferably comprises an opening 230, 232 in the first side leg 222 and the second side leg 224 respectively. The openings 230, 232 preferably are positioned at least partially within the portion of the side legs 222, 224 comprising the tapering configuration 226. In some configurations, the axis of the openings 230, 232 is generally centrally positioned between the base wall 220 and the other edge of the side legs 222, 224.

In the illustrated configuration, the openings 230, 232 each comprises a small lip 234, 236. The small lips 234, 236 can be formed by flowing material during the formation of the opening and can result from a separate operation. The lips 234, 236 can partially or fully surround the openings 230, 232. In some configurations, each of the lips 234, 236 extend outward a distance of about 0.085 inch. The lips 234, 236 allow the side legs 222, 224 to be spaced from the ears 202, 204 of the structural yoke 112. Other configurations also can be used.

The second end 122 of the first and second side legs 222, 224 each comprises an opening 238, 240. The illustrated openings 238, 240 can be generally rectangular in configuration. Other suitable configurations can be used keeping in mind the goal of capturing the nut 124. The dimensions of the openings 238, 240 can be slightly larger than the corresponding dimensions of the nut 124. The openings 238, 240 can each comprise a first end 242 and a second end 244.

The base wall 220 of the first channel member 120 can comprise the opening 132. As illustrated, the opening 132 preferably is positioned at least partially beneath the nut 124. In some configurations, the opening 132 is fully covered by the nut when the nut is viewed along the axis of the opening 132. In some configurations, the opening 132 is positioned between the first end 242 and the second end 244 of the first and second openings 238, 240. Other configurations also can be used.

The opening 132 preferably comprises a lip 246 (see FIG. 3). The lips 246 can partially or fully surround the opening 132. The lip 246 can extend upward from the inner surface of the base wall 220 by a distance of about 0.204 inch. Other dimensions are possible. The lip 246 acts to capture an end of the threaded member 130 that is threaded through the threaded opening 126 in the nut 124. By capturing the end of the threaded member, the likelihood of the nut 124 accidentally falling out of the openings 238, 240 during installation is greatly reduced. The lip 246, thus, elongates the opening 132 and simplifies assembly of the components during manufacturing.

The nut 124 can be zinc finished and can have a thickness of about 0.375 inch. In some configurations, the nut 124 can have a length of about 1.375 inches and a width of about 1.000 inches. Other sizes can be used. As explained above, the nut 124 can comprise the threaded opening 126 (see FIG. 3). In addition, due to the rectangular shape of the nut 124, the nut 124 can be slid into position in the openings 238, 240 in the side legs 222, 224.

The threaded member 130 can be inserted into the threaded opening 126 of the nut 124. In some configurations, the threaded member 130 can be 1035 (AISI-SAE) case hardened to 0.015 minimum depth to through hardened at 45-55 Rockwell C from an annealed condition. In some configurations, the threaded member 130 can have a zinc finish. The threaded member 130 can have any other suitable configuration.

In some configurations, the threaded member 130 comprises a cone tip 250 (see FIG. 5). The cone tip 250 can be sharp. In some configurations, the threaded member 130 can have a flat tip. The cone tip 250, however, helps to gain additional purchase on the sleeve 106 when the threaded member 130 is tightened against the sleeve 106.

The threaded member 130 also can comprise a torque-off head 252. The torque-off head 252 can have any suitable configuration. In the illustrated configuration, the torque-off head 252 can comprise an undercut region 254 that causes the torque-off head 252 to separate from the balance of the threaded member 130 when desired tightening torque levels have been attained. For example, in some configurations, the torque-off head may separate from the body of the threaded member 130 when torque levels of between about 31 and about 35 foot/pounds.

As described above, the lower attachment 140 generally comprises four main components: the yoke 142, the second channel member 150, the nut 154 and the threaded member 160. Other than the yoke 142, the rest of these components are the same as the corresponding components described above with respect to the upper attachment and further description of the components discussed above is not necessary. In addition, the yoke 142 can be secured to the second channel member 150 in the same manners described above for attaching the structural yoke 112 to the first channel member 150.

Figure 6:
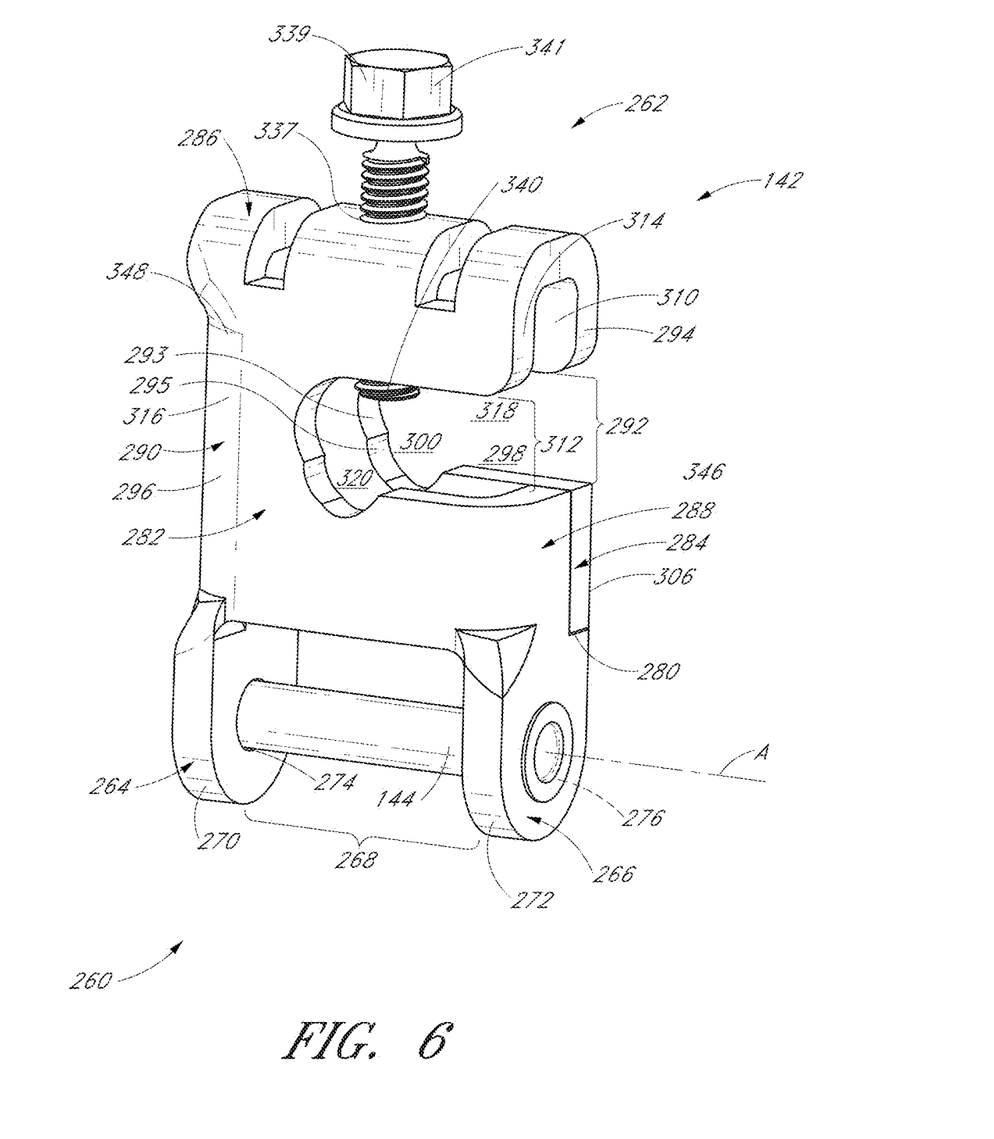
FIG. 6 is an enlarged perspective view of a yoke of a lower attachment of the bracing assembly of FIG. 2.

The yoke 142 will be described now in greater detail. The yoke 142 is generally in the form of a curved and/or bent plate with a plurality of angled and spaced walls or surfaces. The yoke 142 generally comprises a base portion 260, which connects to the second channel member 150, and a main body portion 262, which connects to a threaded rod or the like of an installation or braced component 170.

The base portion 260 generally comprises a pair of spaced and substantially parallel side walls 264, 266 which extend generally vertically and generally parallel to each other and generally perpendicular to a rotation axis A defined by the mechanical fastener 144. A gap 268 can be defined between the two side walls 264, 266. The second channel member 150 can be received between the two side walls 264, 266. Other configurations are possible.

In the illustrated embodiment, the side walls 264, 266 have substantially the same structure. Each of the side walls 264, 266 has a generally rounded or curved end 270, 272. Other configurations are possible.

The first side wall 264 has a hole 274 and the second wall 266 also has a hole 276. The holes 274, 276 are substantially aligned with one another and form part of a passage that receives the mechanical fastener 144 to attach the yoke 142 to the second channel member 150. The rotation axis A passes generally through the center of the holes 274, 276. In the illustrated embodiment, the holes 274, 276 are generally circular though other suitable shapes may be utilized.

Each of the side walls 264, 266 has a generally vertical lower flat surface or end 280, respectively, which is proximate to and/or abuts against a portion of the distal portion 262. In the illustrated embodiment, the base portion 260 and the distal portion 262 are integrally connected to form an integral unit though in modified embodiments they may be comprise individual or independent components that are attached to one another. The base portion 260 and the distal portion 262 are mechanically connected or in mechanical communication with one another.

The main body portion 262 generally comprises a pair of generally horizontal walls or jaws 282, 284 spaced by a distal end wall 286 and a pair of generally vertical side walls 288, 290 spaced by the horizontal wall 282. The upper wall 284 and the lower wall 282 extend substantially parallel to one another. The end wall 286 extends generally parallel to the rotation axis A. The side walls 288, 290 are generally parallel to one another and extend generally perpendicular to the rotation axis A.

The walls 282, 284, 286, 288 and 290 are generally rectangular in shape. In the illustrated embodiment, the upper and lower walls 284, 282 have substantially the same structure and the side walls 288, 290 have generally the same structure.

The upper wall 284 has a passage 292 which extends from a side edge 294 towards an opposite side edge 296. The passage 292 is generally U-shaped and has a rectangular portion and a curved or rounded portion. The passage 292 includes an open end 298 and a generally rounded closed end 300 in the form of a half- or semi-circle.

The illustrated rounded portion advantageously comprises a first radius 293 and a second radius 295. The two radii 293, 295 have offset centers 297, 299 (see FIG. 7) and have different radii. In one configuration, the first radius 293 is about 0.877 inch while the second radius is about 0.752 inch with the center of the second radius 295 being offset toward the axis of rotation A by about 0.196 inch. Additional radii and offset centers also can be used and, in fact, are shown in the illustrated configuration. The offset and varied radii allow a single yoke 142 to accommodate more than one size of threaded member or braced component 170, which reduces the number of different parts that an installer or distributor must stock.

Figure 7:
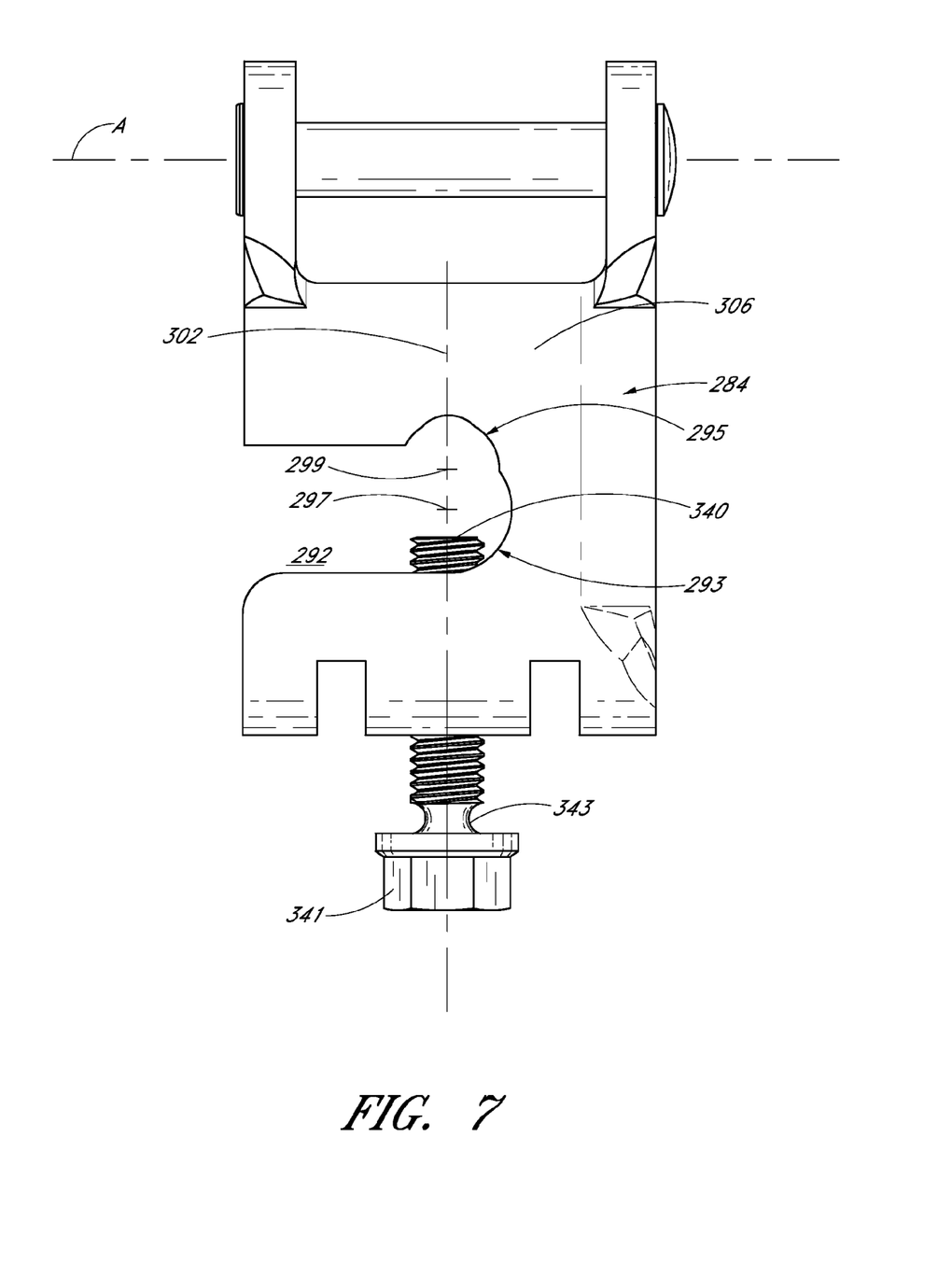
FIG. 7 is a bottom view of the yoke of the lower attachment shown in FIG. 6.

The sizing of the slots 292, 312 is customizable to engage different size hanger rods (e.g. braced component 170) with a suitably small tolerance fit. In one embodiment, the slots 292, 312 can accommodate rod sizes or diameters in the range from about 0.375 inch to about 0.625 inch or from about 0.75 inch to about 0.875 inch. In modified embodiments, the slots 292, 312 may be dimensioned to accommodate larger or smaller rod sizes with efficacy, as needed or desired.

The upper wall 284 is oriented generally perpendicular to the proximal portion side walls 264, 266. As shown in FIG. 7, a line passing through each of the centers 297, 299 of the radii 293, 295 can be referred to herein as the longitudinal axis 302 of the passage 292 or of its rod- or bolt-receiving cavity or portion. In the illustrated embodiment, the slot longitudinal axis 302 is generally perpendicular to the rotation axis A.

The upper wall 284 preferably is generally flat on its upper surface 306 and on its lower surface 310. In some embodiments, a "coining" operation is utilized to form a recess and a resulting protrusion at these surfaces. The recess could be sized and configured to provide clearance space for, and to form an interference fit with, a nut used to secure the yoke 142 to a threaded rod or bolt of an installation. The nut would matingly interlock with the recess in such a configuration, which is shown in U.S. patent application Ser. No. 10/909,257, published as United States Patent Application Publication No. 2006/0024127, which is incorporated herein by reference in its entirety and, in addition, specifically with respect to the connector structure shown therein.

The lower wall 282 has the passage 312 which extends from a side edge 314 towards an opposite side edge 316. The upper and lower slots 292 and 312 are substantially identical in shape and preferably are axially aligned with one another. The passage 312 includes an open end 318 and a generally rounded closed end 320 as described above. As discussed further below, the passage 312 (and passage 292) is sized and configured to receive (for example, by substantially laterally slidingly) a threaded rod or bolt of an installation.

The slots 292, 312 open with respective open ends 298, 318 at respective side edges 294, 314. In another embodiment, the slots 292, 312 can open with respective open ends 298, 318 at opposite respective side edges 296, 316.

The end or distal wall 286 is generally rectangular in shape and extends between and spaces the top and bottom walls 284, 282. Thus, the end wall 286 is mechanically connected or in mechanical communication with the upper and lower walls 282, 284. The end wall 286 is generally perpendicular to the other walls 264, 266, 282, 284, 288 and 290.

The end wall comprises a threaded hole 337. The threaded hole 337 receives a threaded member 339. The threaded hole 337 preferably has an axis that intersects the axes of the radii 293, 295. In this manner, when the threaded member 339 is tightened toward the axes of the radii 293, 295, an end of the threaded member 339 can come into contact with any threaded rod or the like that is positioned within the passages 292, 312. Thus, the threaded member 339 can lock the braced component 170 into the passages 292, 312, which further enhances the ability of the yoke 142 to be used with rods of varying diameters. Other configurations are possible.

In some configurations, the threaded member 339 can be 1035 (AISI-SAE) case hardened to 0.015 minimum depth to through hardened at 45-55 Rockwell C from an annealed condition. In some configurations, the threaded member 339 can be carbon steel with a zinc finish. The threaded member 339 can have any other suitable configuration.

In some configurations, the threaded member 339 comprises a flat tip 340. The flat tip helps to secure the threaded member into position within the yoke. The threaded member 339 also can comprise a torque-off head 341. The torque-off head 341 can have any suitable configuration. In the illustrated configuration, the torque-off head 341 can comprise an undercut region 343 that causes the torque-off head 341 to separate from the balance of the threaded member 130 when desired tightening torque levels have been attained. For example, in some configurations, the torque-off head 341 may separate from the body of the threaded member 339 when torque levels of between about 12 and about 15 foot/pounds. Other configurations also can be used.

The side walls 288, 290 are generally coplanar with respective proximal side walls 264, 266 and are generally parallel to the side walls 264, 266. The side wall 288 is mechanically connected to or in mechanical communication with the proximal side wall 264 and the side wall 290 is mechanically connected to or in mechanical communication with the proximal side wall 266. The side walls 288, 290 are generally perpendicular to the upper wall 282, the lower wall 284 and the end wall 286.

The side walls 288, 290 are spaced from the end or distal wall 286 and extend towards it. The side wall 288 terminates at an edge 346 of the passage 292. The side wall 290 terminates at a line 348 offset from the edge 346.

The yoke 142 is fabricated from a suitably strong material to meet the standards set by the Underwriters Laboratories (U.L.), Factory Mutual Engineering (F.M.), and other such quality control groups. Preferably, the yoke 142 is fabricated from steel. In one embodiment, the yoke 142 comprises a mild steel. In another embodiment, the yoke 142 comprises a carbon steel. In modified embodiments, the yoke 142 may be fabricated from other suitably strong materials such as other metals, alloys, ceramics, plastics, laminates, reinforced composites, combinations thereof and the like, as needed or desired.

The yoke 142 may be provided with a suitable surface treatment or coating to enhance its durability and/or appearance. In one embodiment, the yoke 142 has a surface coating to provide an electro-galvanized finish. Preferably, the yoke 142 has a zinc finish.

In some configurations, the yoke 142 has a bent length of about 3.406 inches, a width of about 2.09 inches, and a height of about 1 inch. The yoke 142 can be bent from a material having a thickness of about 0.25 inch. In some configurations, the proximal side walls 264, 266 have a length of about 1.828 inches. Other sizes and configurations also can be used.

The sleeve 106 (a shortened form is shown on Sheet 10) can be a piece of strut or the like. In general, sleeve 106 comprises a generally U-shaped configuration when viewed in cross-section. Thus, the sleeve 106 preferably comprises a bottom wall 500, a first side wall 502 and a second side wall 504. The first side wall 502 preferably extends between the bottom wall 500 and a first top wall 506 while the second side wall 504 preferably extends between the bottom wall 500 and a second top wall 508. The first top wall 506 preferably extends between the first side wall 502 and a first inside wall 510 while the second top wall 508 preferably extends between the second side wall 504 and a second inside wall 512. The first and second inside walls 510, 512 preferably are substantially shorter that the first and second side walls 502, 504. Moreover, in some configurations, the first and second inside walls 510, 512 extend generally parallel to the first and second side walls 502, 504. Other suitable configurations can be used.

Although the present invention has been described in terms of a certain embodiment, other embodiments apparent to those of ordinary skill in the art also are within the scope of this invention. Thus, various changes and modifications may be made without departing from the spirit and scope of the invention. For instance, various components may be repositioned as desired. Moreover, not all of the features, aspects and advantages are necessarily required to practice the present invention. Accordingly, the scope of the present invention is intended to be defined only by the claims that follow.

What is claimed is:

1. A bracing assembly comprising a structural yoke, a first channel member pivotally secured to the structural yoke, a sleeve secured to the first channel member, a second channel member secured to the sleeve, a bracing yoke pivotally secured to the second channel member about an axis of rotation, the bracing yoke comprising a passageway having an open end extending from a side of the bracing yoke and terminating at a closed end opposite the open end, the passageway comprising two different radii disposed substantially at the closed end that have two different centerpoints offset from one another relative to the axis of rotation, and a threaded member extending through at least a portion of the bracing yoke.

2. The bracing assembly of claim 1, wherein a threaded member secures the first channel member to the sleeve and the threaded member comprises a torque-off head.

3. The bracing assembly of claim 1, wherein a threaded member secures the second channel member to the sleeve and the threaded member comprises a torque-off head.

4. The bracing assembly of claim 1, wherein the threaded member comprises a torque-off head.

5. The bracing assembly of claim 1, wherein the first channel member comprises a first wall and a second wall, the first and second wall extending generally parallel to each other, a first opening being formed in the first wall and a second opening being formed in the second wall, the first and second openings being generally aligned and a nut extending between the first and second walls and being at least partially positioned within the first and second openings.

6. The bracing assembly of claim 1, wherein the first channel member comprises an opening, a threaded member extending through the opening and abutting against a first portion of the sleeve, a second portion of the sleeve that is opposite to the first portion of the sleeve being brought into engagement with the first channel member as the threaded member is tightened into engagement with the first portion of the sleeve.

7. The bracing assembly of claim 1, wherein at least one of the first and second channel members extends into the sleeve.

8. A method of bracing comprising attaching a first yoke to a first surface, the first yoke being movably connected to a first channel, moving a second channel away from the first channel, the second channel being connected to the first channel with a sleeve, securing a second yoke to a hanging support member, the second yoke comprising a passageway having an open end extending from a side of the second yoke to receive the hanging support member and terminating at a closed end opposite the open end, the second yoke being movably connected to the second channel about an axis of rotation, the passageway comprising two different radii disposed substantially at the closed end that have two different centerpoints offset from one another relative to the axis of rotation, and securing the position of the sleeve relative to the first channel and the second channel.

9. The method of claim 8 wherein securing the position of the sleeve comprises tightening threaded fasteners into engagement with the sleeve.

10. The method of claim 9 further comprising tightening the threaded fasteners until a break-away head separates from a body of one or more of the threaded fasteners.

11. The bracing assembly of claim 7, wherein a threaded member extends through the first channel member and engages the sleeve.

\* \* \* \* \*